(12) United States Patent
Salter et al.

(10) Patent No.: US 9,440,584 B2
(45) Date of Patent: Sep. 13, 2016

(54) PHOTOLUMINESCENT VEHICLE CONSOLE (71) Applicant: Ford Global Technologies, LLC, Dearborn, MI (US)

(72) Inventors: Stuart C. Salter, White Lake, MI (US); Cornel Lewis Gardner, Romulus, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 14/486,476

(22) Filed: Sep. 15, 2014

(65) Prior Publication Data
US 2015/0197191 A1 Jul. 16, 2015

Related U.S. Application Data (63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
*B60Q 3/02* (2006.01)
*B60Q 3/00* (2006.01)

(52) U.S. Cl.
CPC ............. *B60Q 3/0243* (2013.01); *B60Q 3/004* (2013.01); *B60Q 3/022* (2013.01); *B60Q 3/0223* (2013.01); *B60Q 3/0283* (2013.01); *B60Q 3/0289* (2013.01)

(58) Field of Classification Search
CPC B60Q 3/0243; B60Q 3/0223; B60Q 3/0289; B60Q 3/004; B60Q 3/022; B60Q 3/0283
See application file for complete search history.

(56) References Cited

U.S. PATENT DOCUMENTS

| | | |
|---|---|---|
| 3,168,346 A | 2/1965 | Rei, Jr. |
| 5,409,297 A | 4/1995 | De Filippo |
| 5,709,453 A | 1/1998 | Krent et al. |
| 6,729,738 B2 | 5/2004 | Fuwausa et al. |
| 6,773,129 B2 | 8/2004 | Anderson, Jr. et al. |
| 6,851,840 B2 | 2/2005 | Ramamurthy et al. |
| 6,871,986 B2 | 3/2005 | Yamanaka et al. |
| 6,974,238 B2 | 12/2005 | Sturt et al. |
| 6,990,922 B2 | 1/2006 | Ichikawa et al. |
| 7,178,865 B2 | 2/2007 | Yetukuri et al. |
| 7,213,923 B2 | 5/2007 | Liu et al. |
| 7,264,366 B2 | 9/2007 | Hulse |
| 7,264,367 B2 | 9/2007 | Hulse |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — David V Bruce
(74) *Attorney, Agent, or Firm* — Vichit Chea; Price Heneveld LLP (57) ABSTRACT

A vehicle illumination apparatus is disclosed. The vehicle illumination apparatus comprises a console rotatably connected to a portion of a seat. The console is operable to rotate from a first position to a second position. A light source is disposed proximate the console and configured to emit a first emission of light. The illumination apparatus further comprises at least one light guide configured to direct the first emission to a first photoluminescent portion disposed on the console when the console is oriented in the first position.

20 Claims, 6 Drawing Sheets

(56) References Cited

U.S. PATENT DOCUMENTS

| | | |
|---|---|---|
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,850,244 B2 | 12/2010 | Salewski |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0002273 A1 | 1/2003 | Anderson, Jr. et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2011/0164430 A1 | 7/2011 | Li |
| 2012/0001406 A1 | 1/2012 | Paxton et al. |
| 2012/0280528 A1 | 11/2012 | Dellock et al. |
| 2013/0200239 A1 | 8/2013 | Kim |
| 2013/0235604 A1 | 9/2013 | Ukai et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |
| 2016/0023594 A1* | 1/2016 | Salter .................. B60Q 3/0293 315/153 |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 0604375 B1 | 1/1996 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

PHOTOLUMINESCENT VEHICLE CONSOLE

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to a vehicle lighting apparatus, and more particularly, to a vehicle lighting apparatus employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, a vehicle illumination apparatus is disclosed. The vehicle illumination apparatus comprises a console rotatably connected to a portion of a seat. The console is operable to rotate from a first position to a second position. A light source is disposed proximate the console and configured to emit a first emission of light. The illumination apparatus further comprises at least one light guide configured to direct the first emission to a first photoluminescent portion disposed on the console when the console is oriented in the first position.

According to another aspect of the present invention, a vehicle illumination apparatus is disclosed. The vehicle illumination apparatus comprises a console disposed proximate a seat and a light source disposed proximate the console. The light source is configured to transmit a first emission of light through at least a portion of the console. The illumination apparatus further comprises a photoluminescent portion disposed on the seat, wherein the first emission is emitted from the console to illuminate the photoluminescent portion in a second emission. In some implementations, the console may correspond to any moveable portion or object connected to a vehicle configured to be arrange in a first position and a second position, for example a door, access panel, seatback, etc.

According to yet another aspect of the present invention, a vehicle illumination apparatus is disclosed. The vehicle illumination apparatus comprises a console rotatably connected to a portion of a seat. The console is operable to rotate from a first position to a second position relative to the seat. The illumination apparatus further comprises a light source configured to emit a first emission of light and at least one light guide. The at least one light guide is configured to direct the first emission to a first photoluminescent portion disposed on the seat when the console is oriented in the first position. In response to receiving the first emission, the first photoluminescent portion is configured to emit a second emission emitted from the first photoluminescent portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting apparatus for a vehicle configured to illuminate at least a portion of a console. In some implementations, a light source may be utilized to illuminate a cupholder disposed in a retractable console in a first position. Additionally, the light source may be utilized to illuminate a portion of a vehicle seat and/or a cargo compartment in a second position. The light source may be configured to emit light at a first wavelength or primary emission to excite a photoluminescent structure.

The photoluminescent structure may be configured to convert the first wavelength of the light or an excitation emission into a second wavelength or second emission. The first wavelength of the light may correspond to a first color of light and the second wavelength may correspond to a second color of light, different from the first color. While the various implementations of the lighting apparatus described herein refer to specific structures demonstrated in reference to at least one automotive vehicle, it will be appreciated that the vehicle lighting apparatus may be utilized in a variety of applications.

Figure 1:
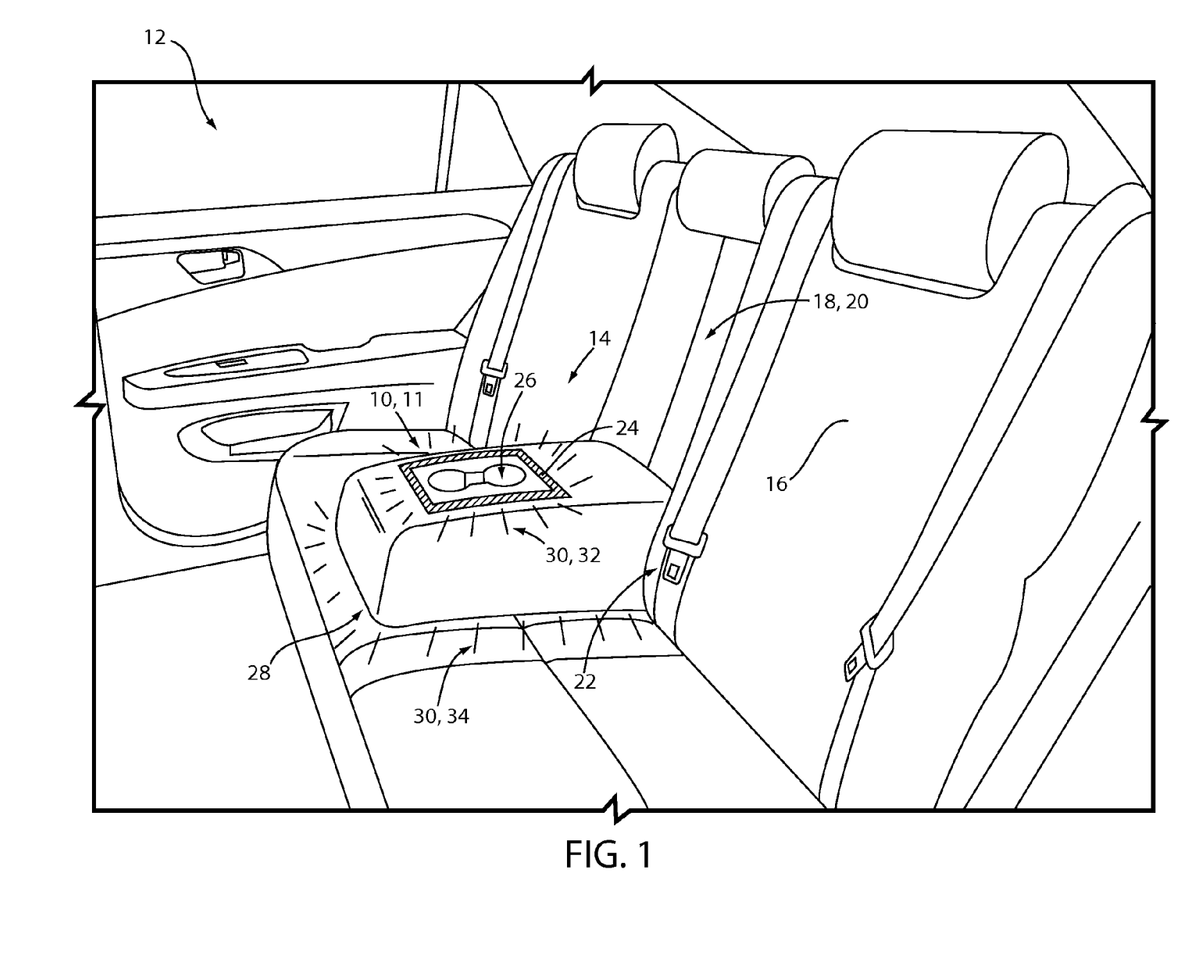
FIG. 1 is a perspective view of a passenger compartment of an automotive vehicle demonstrating a lighting apparatus.

Referring to FIG. 1, a perspective view of a retractable console 10 is shown in a first position 11 located in a passenger compartment 12 of a vehicle. The console 10 may comprise a lighting apparatus 14 operable to provide lighting for the passenger compartment 12. The lighting apparatus 14 is shown disposed in a rear passenger seat 16 and is configured to rotatably engage a cavity 18 formed in a central portion 20 of the rear passenger seat 16. As shown, the console 10 is oriented in the first position 11 and is configured to serve as an armrest for a passenger. In a second position 21, as demonstrated in FIG. 5B, the console 10 may be at least partially concealed within the cavity 18 to provide for additional seating capacity.

The lighting apparatus 14 comprises a light source 22 disposed proximate the console 10. The light source 22 may be disposed on or partially within the passenger seat 16 proximate the cavity 18. The light source 22 is configured to emit a first emission or excitation emission of light at a first wavelength. In the first position 11, the lighting apparatus 14 may be configured to illuminate a first photoluminescent portion 24 disposed proximate a cupholder 26 and may further illuminate a second photoluminescent portion 28 directed toward at least a portion of the rear passenger seat 16. The first emission from the light source 22 may be transmitted through a first light guide disposed in the console to illuminate the first photoluminescent portion 24 and/or the second photoluminescent portion 28.

In some implementations, the console 10 may correspond to any moveable portion or object connected to a vehicle configured to be arrange in a first position and a second position, for example a door, access panel, seatback, etc. In such implementations, the moveable portion or object may comprise at least one light guide configured to direct the first emission to a first photoluminescent portion in the first position and may also be configured to direct the first emission to a second photoluminescent portion in the second position. The at least one light guide may be disposed at least partially within the moveable object and operable to selectively transmit the first emission from a light source as discussed herein. In this way, the disclosure may provide for a lighting system that may be utilized for a variety of applications in the vehicle.

Each of the photoluminescent portions, for example the first photoluminescent portion 24 and the second photoluminescent portion 28, may be configured to convert the excitation emission having the first wavelength to an output emission 30. The output emission 30 may correspond to a second emission 32 emitted from the first photoluminescent portion 24 and a third emission 34 emitted from the first photoluminescent portion 28. The output emission 30 may generally comprise at least a second wavelength of the light having a longer wavelength than the first wavelength. As discussed herein, each of the photoluminescent portions may be configured to have various photochemical properties configured to convert the first emission at the first wavelength to the output emission 30 (e.g. the second emission 32, third emission 34, etc). An output emission, as discussed herein may comprise a second wavelength and additional wavelengths (e.g. a third wavelength), which may include various combinations of wavelengths to emit light in various colors from each of the photoluminescent portions.

The first wavelength may correspond to an emission of light having a violet or deep blue color. The first wavelength may have a peak wavelength of approximately less than 500 nm. The second wavelength and other wavelengths corresponding to output emissions 30 may have at least one wavelength longer than the first wavelength. In some implementations, the output emission 30 may correspond to a plurality of wavelengths that may cause the output emission 30 to appear as significantly white light. In this configuration, the light emitted from the light source 22 at the first wavelength is configured to excite the first photoluminescent portion 24. In response to the excitation caused by the light at the first wavelength, the first photoluminescent portion 24 is configured to convert the first wavelength to emit the second emission 32 to illuminate the cupholder 26.

Figure 5A:
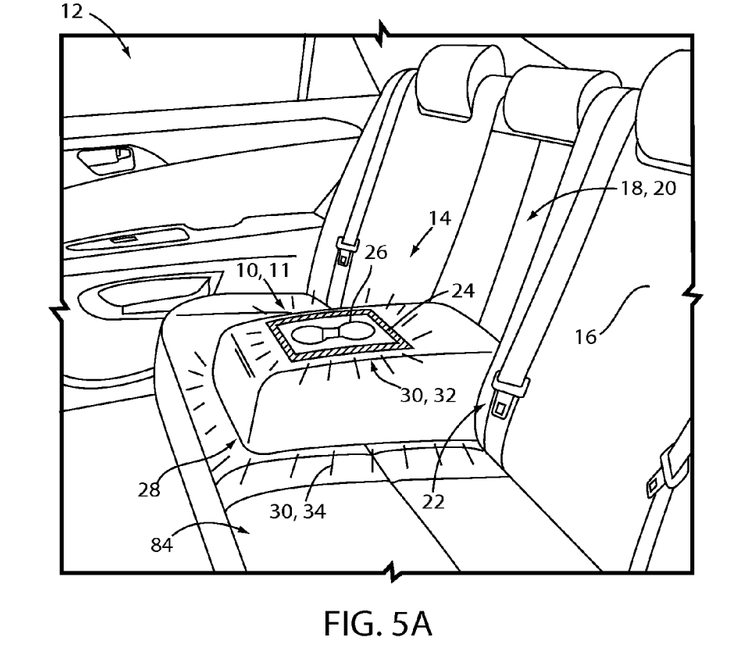
FIG. 5A is a perspective view of a lighting apparatus configured to illuminate at least a portion of a vehicle console in a first position.
Figure 5B:
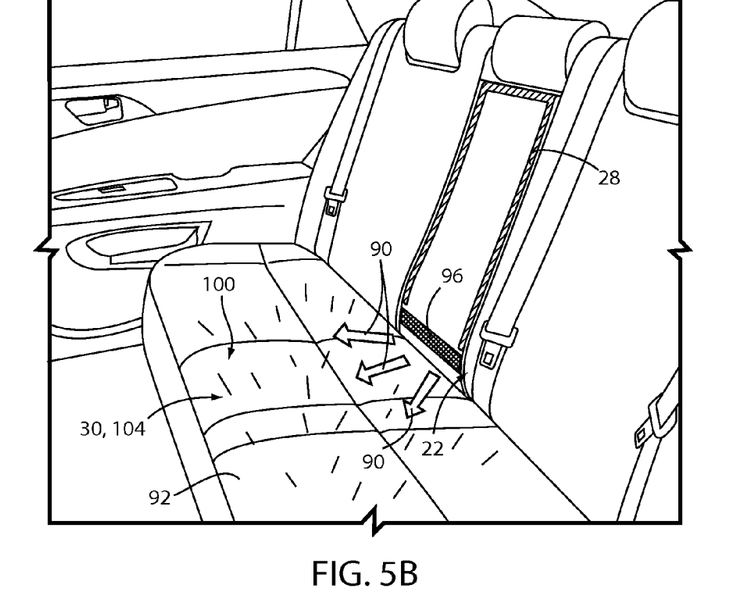
FIG. 5B is a perspective view of a lighting apparatus configured to illuminate at least a portion of a vehicle console in a second position.
Figure 5C:
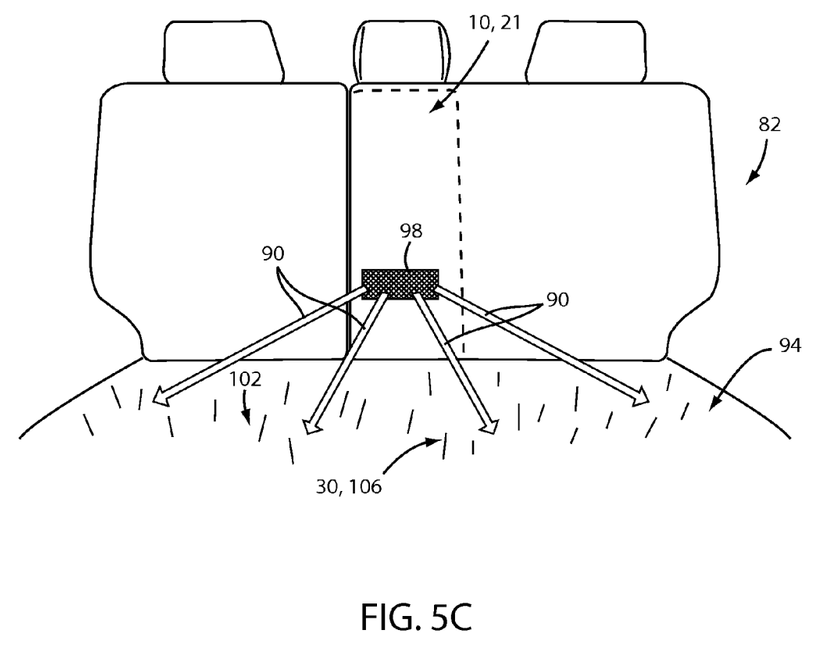
FIG. 5C is a perspective view of a lighting apparatus configured to illuminate at least a portion of a vehicle cargo compartment in a second position corresponding to FIG. 5C.
Figure 6A:
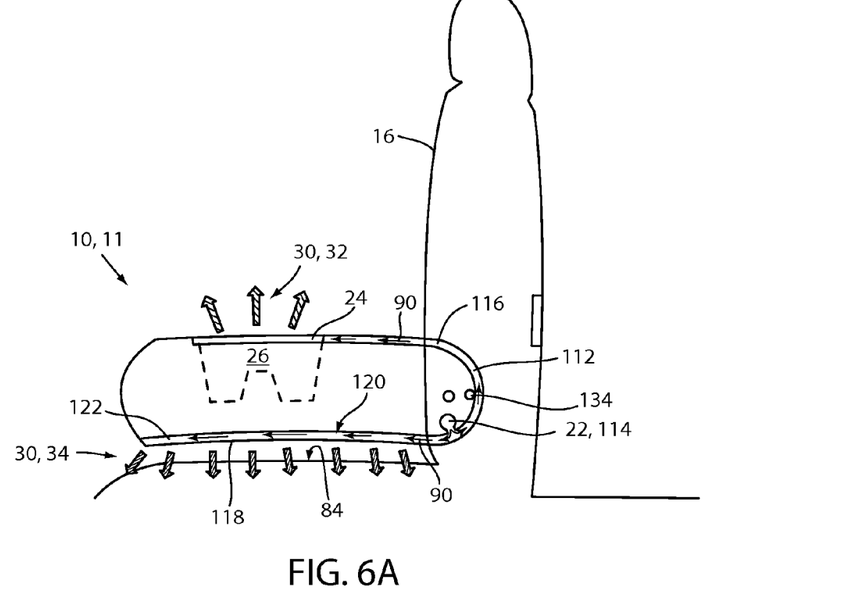
FIG. 6A is a cross-sectional view of lighting apparatus demonstrating a console in a first position.
Figure 6B:
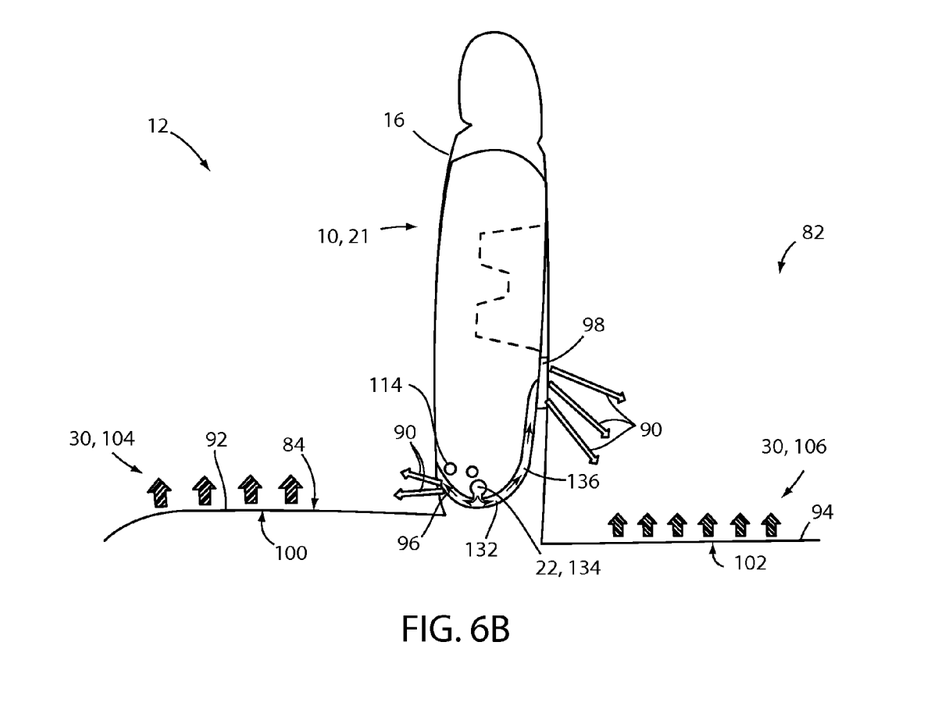
FIG. 6B is a cross-sectional view of lighting apparatus demonstrating a console in a second position.

As discussed in reference to FIGS. 5B, 5C, and 6B, the lighting apparatus 10 may further be operable to illuminate a plurality of additional photoluminescent portions in the second position 21. In an exemplary implementation, the lighting apparatus 10 may comprise a second light guide that is configured to transmit the first emission from the light source 22 in the second position 21. In this configuration, the first light guide may align with the light source 22 in the first position 11, and the second light guide may align with the light source 22 in the second position 21. In this way, the rotational engagement of the console 10 to the cavity 18 may serve to selectively engage the first light guide or the second light guide in the first position 11 and the second position 21, respectively.

The light emitted from the light source 22 at the first wavelength may correspond to a color of light that is less perceptible by the human eye in comparison to the second wavelength and the third wavelength. This configuration may provide for the second emission 32 and the third emission 34 to be activated by the light source 22, which may be projected from a single location corresponding to the light source 22. The lighting apparatus 14 is configured to provide accent lighting to illuminate at least a portion of the cupholder 26 and the rear passenger seat 16. By limiting the number of light sources required to provide the lighting discussed herein, the disclosure provides for a cost-effective method for providing lighting for a vehicle.

Figure 2A:
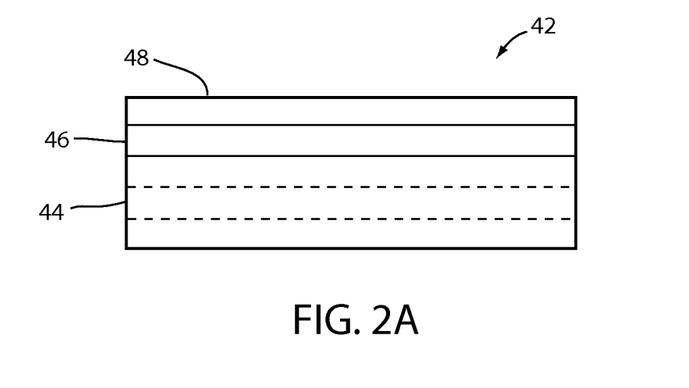
FIG. 2A illustrates a photoluminescent structure rendered as a coating.
Figure 2B:
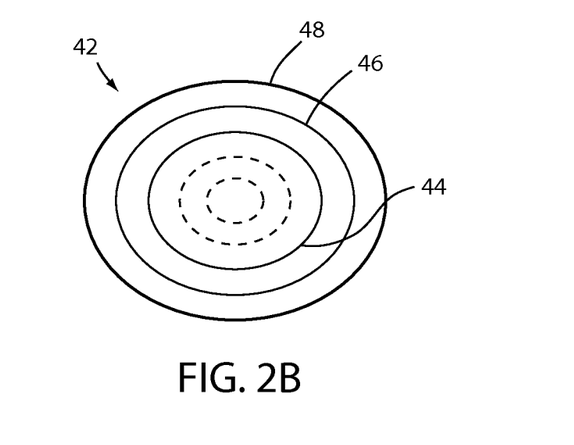
FIG. 2B illustrates the photoluminescent structure rendered as a discrete particle.
Figure 2C:
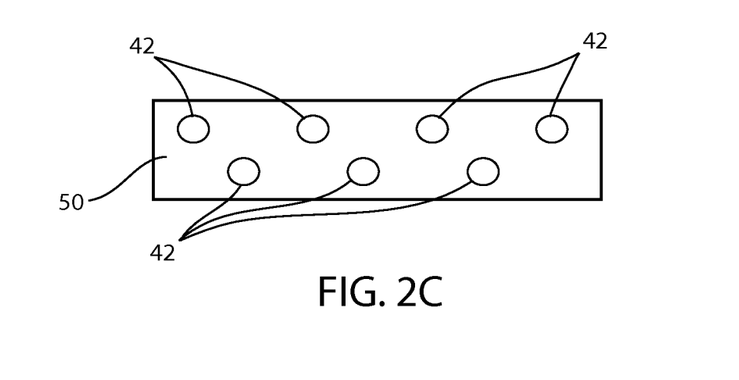
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a surface of the vehicle, a discrete particle capable of being implanted into a surface, and a plurality of discrete particles incorporated into a separate structure capable of being applied to a surface, respectively. As discussed herein, a surface of the vehicle may correspond to an at least partially light transmissive fabric, panel, and/or fixture operable to at least partially transmit the first emission therethrough. The photoluminescent structure 42 may correspond to the photoluminescent portions as discussed herein, for example the first photoluminescent portion 24 and the second photoluminescent portion 28.

At the most basic level, the photoluminescent structure 42 includes an energy conversion layer 44 that may be provided as a single layer or a multilayer structure, as shown through broken lines in FIGS. 2A and 2B. The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle surface. The energy conversion layer 44 coating may be deposited on a vehicle surface by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a fabric, fixture, and/or panel of the vehicle. When the energy conversion layer 44 includes a multilayer formulation, each layer may be sequentially coated. Additionally, the layers can be separately prepared and later laminated or embossed together to form an integral layer. The layers may also be coextruded to prepare an integrated multi-layered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protection layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a desired surface of the vehicle.

In some implementations, the photoluminescent structure 42 may be incorporated into a fabric, fixture, and/or panel of the vehicle as one or more discrete multilayered particles as shown in FIG. 2C. The photoluminescent structure 42 may also be provided as one or more discrete multilayered particles dispersed in a polymer formulation 50 that is subsequently applied to a surface of the vehicle as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
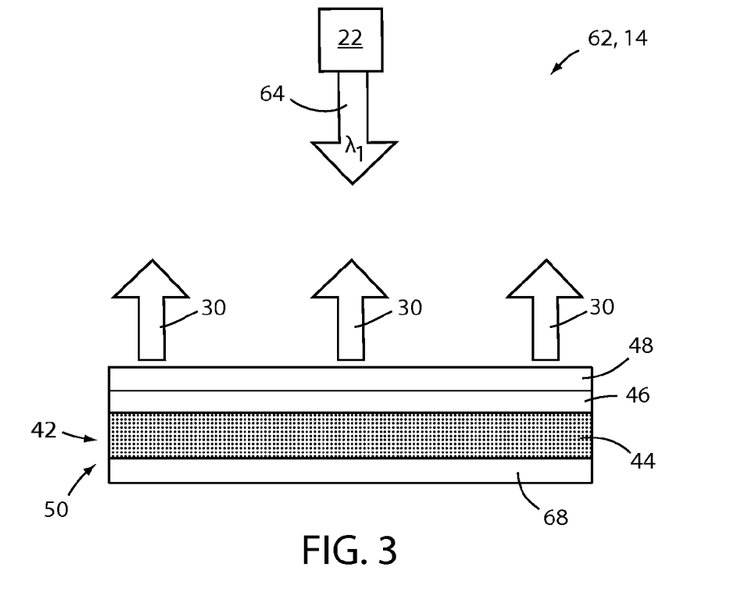
FIG. 3 is schematic view of a front-lit configuration of a lighting apparatus configured to convert a first wavelength of light to at least a second wavelength.

Referring to FIG. 3, the lighting apparatus 14 is generally shown according to a front-lit configuration 62. The front-lit configuration 62 may particularly correspond to a configuration operable to illuminate a portion a cargo compartment as discussed in reference to FIG. 5C. In this configuration, the light or a first emission 64 emitted from the light source 22 is converted to the output emission 30 by the energy conversion layer 44. The first emission 64 comprises a first wavelength $\lambda_1$, and the output emission 30 comprises at least a second wavelength $\lambda_2$. The lighting apparatus 14 comprises the photoluminescent structure 42 disposed on or in at least one photoluminescent portion as discussed herein. The photoluminescent structure 42 may be rendered as a coating and/or dispersed in a material forming a surface 68 of the vehicle, for example an interior panel or fabric portion of the passenger compartment 12. The photoluminescent material may also be dispersed as a polymer matrix 50 corresponding to the energy conversion layer 44.

In some implementations, the energy conversion layer 44 may further include the stability layer 46 and/or protective layer 48. In response to the light source 22 being activated, the first emission 64 is received by the energy conversion layer 44 and converted from the first emission 64 having the first wavelength $\lambda_1$ to the output emission 30 having at least the second wavelength $\lambda_2$. The output emission 30 may comprise a plurality of wavelengths configured to emit any color of light from a photoluminescent portion as discussed herein.

In various implementations, the lighting apparatus 14 comprises at least one photoluminescent material incorporated in the polymer matrix 50 and/or energy conversion layer 44 and is configured to convert the first emission 64 at the first wavelength $\lambda_1$ to the output emission 30 having at least the second wavelength $\lambda_2$. In order to generate the plurality of wavelengths, the energy conversion layer 44 may comprise one or more photoluminescent materials configured to emit the output emission 30 as wavelengths of light in the red, green, and/or blue color spectrums. Such photoluminescent materials may further be combined to generate a wide variety of colors of light for the output emission 30. For example, the red, green, and blue-emitting photoluminescent materials may be utilized in a variety of proportions and combinations to control the output color of the output emission 30.

Each of the photoluminescent materials may vary in output intensity, output wavelength, and peak absorption wavelengths based on a particular photochemical structure and combinations of photochemical structures utilized in the energy conversion layer 44. As an example, the output emission 30 may be changed by adjusting the wavelength of the first emission $\lambda_1$ to activate the photoluminescent materials at different intensities to alter the color of the output emission 30. In addition to, or alternatively to the red, green, and blue-emitting photoluminescent materials, other photoluminescent materials may be utilized alone and in various combinations to generate the output emission 30 in a wide variety of colors. In this way, the lighting apparatus 14 may be configured for a variety of applications to provide a desired lighting color and effect for a vehicle.

To achieve the various colors and combinations of photoluminescent materials described herein, the lighting apparatus 14 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The light source 22 may also be referred to as an excitation source and is operable to emit at least the first emission 64. The light source 22 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 64. The first emission 64 from the light source 22 may be configured such that the first wavelength $\lambda_1$ corresponds to at least one absorption wavelength of the one or more photoluminescent materials of the energy conversion layer 44 and/or polymer matrix 50. In response to receiving the light at the first wavelength $\lambda_1$, the energy conversion layer 44 may become excited and output the one or more output wavelengths, for example, the second emission 32 having the second wavelength $\lambda_2$. The first emission 64 provides an excitation source for the energy conversion layer 44 by targeting absorption wavelengths of a particular photoluminescent material or combination thereof utilized therein. As such, the lighting apparatus 14 may configured to output the output emission 30 to generate a desired light intensity and color.

In an exemplary implementation, the light source 22 comprises an LED configured to emit the first wavelength $\lambda_1$ which may correspond to a blue spectral, violet, and/or ultra-violet color range. The blue spectral color range comprises a range of wavelengths generally expressed as blue light (~440-500 nm). In some implementations, the first wavelength $\lambda_1$ may comprise a wavelength in the ultraviolet and near ultraviolet color range (~100-450 nm). In an exemplary implementation, $\lambda_1$ may be approximately equal to 470 nm. Though particular wavelengths and ranges of wavelengths are discussed in reference to the first wavelength $\lambda_1$, the first wavelength $\lambda_1$ may generally be configured to excite any photoluminescent material.

The first wavelength $\lambda_1$ may be approximately less than 500 nm. The blue spectral color range and shorter wavelengths may be utilized as an excitation source for the lighting apparatus 14 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting apparatus 14 creates a visual effect of light originating from the photoluminescent structure 42.

As discussed herein, each of the plurality of wavelengths corresponding to the output emission(s) 30 may correspond to a significantly different spectral color range. The second wavelength $\lambda_2$ may correspond to a plurality of wavelengths configured appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the each of the photoluminescent portions (e.g. the first photoluminescent portion 24 and the second photoluminescent portion 28) converted from the first wavelength $\lambda_1$. Each of the output emissions (e.g. the third emission 34, etc.) may similarly utilize photoluminescent materials to output a color of light different from the first emission 64 and in some implementations, different from the second emission 32.

Figure 4:
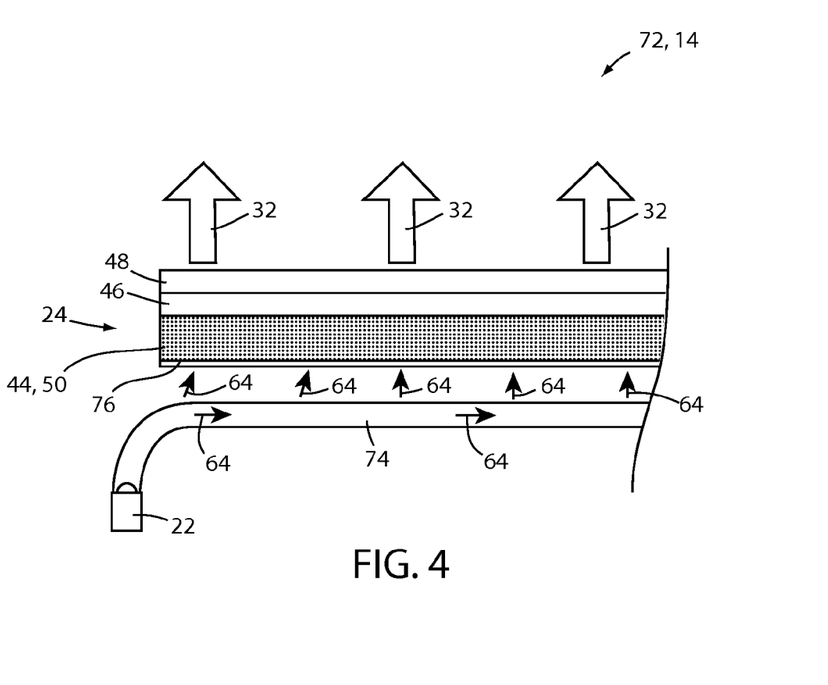
FIG. 4 is schematic view of a back-lit configuration of a lighting apparatus configured to convert a first wavelength of light to at least a second wavelength.

Referring to FIG. 4, the lighting apparatus 14 is generally shown according to a back-lit configuration 72 to convert the first emission 64 from the light source 22 to the output emission 30. The back-lit configuration may correspond to at least one of the photoluminescent portions disposed in the console 10. As such, the back-lit configuration is discussed in reference to the first photoluminescent portion, which is configured to emit the second emission 32 in response to receiving the first emission 64.

In the back-lit configuration 72, the lighting apparatus 14 may comprise a light guide, for example a light guide 74. The first light guide 74 may be configured to channel the light at the first wavelength $\lambda_1$ substantially along the first photoluminescent portion 24 and the second photoluminescent portion 28 in the first position 11. The light guide 74 may be of any material configured to transmit the light at the first wavelength $\lambda_1$ substantially along the extents of a panel 76. In this example, the panel 76 may correspond to a portion of the cupholder 26 composed of a polymeric material and having the first photoluminescent portion 24 disposed thereon. The panel 76 may also be at least partially light transmissive such that the first emission 64 may pass there through. In some implementations, the light guide 74 may comprise a polymeric material configured to provide a refractive index such that the light at the first wavelength $\lambda_1$ is transmitted consistently along the panel 76. The light guide 74 may correspond to a first light guide 112 and a second light guide 132 as discussed herein.

The back-lit configuration 72 may comprise an energy conversion layer 44 and/or photoluminescent material dispersed in a polymer matrix 50 disposed on and/or dispersed in the panel 76. Similar to the energy conversion layer 44 demonstrated in reference to the front-lit configuration 62, the energy conversion layer 44 may be configured to be excited and output the one or more wavelengths corresponding to the second wavelength in response to receiving the first emission 64. The at least one wavelength of the second emission 32 may be configured to emit any color of light from the first photoluminescent portion 24 in response to the excitation of the energy conversion layer 44. The color of the light corresponding to the second emission 32 may be controlled by utilizing particular types and/or ratio of photoluminescent materials as discussed herein.

Referring now to FIGS. 5A, 5B, and 5C, the retractable console 10 is shown in the first position 11 and the second position 21. FIGS. 5A and 5B demonstrate a perspective view of the retractable console in the first position 11 and the second position 21, respectively. FIG. 5C demonstrates a cargo compartment 82 of the vehicle with the console 10 oriented in the second position 21. In the first position 11, the light source 22 is aligned with the first light guide and may be configured to illuminate the first photoluminescent portion 24, corresponding to the cupholder 26. The first light guide may also be configured to direct the first emission to the second photoluminescent portion 28 to illuminate a seat-deck portion 84.

Referring to FIG. 5A, in first position 11, the first emission 64 comprising the first wavelength of light may be transmitted through the first light guide to the first photoluminescent portion 24 and the second photoluminescent portion 28. The first photoluminescent portion 24 may convert the first emission to the second emission 32 comprising the second wavelength. The second photoluminescent portion 28 may convert the first emission to the third emission 34 comprising the third wavelength. As discussed herein, each of the second emission 32 and the third emission 34 may be emitted in a variety of colors that may differ for each of the output emissions 30. The color of each emission may be controlled by utilizing specific photoluminescent materials and combinations thereof to control one or more wavelengths corresponding to the second wavelength, the third wavelength, etc. In this way, each of the output emissions 30 may be configured to emit a color of light to create a desired color scheme for the ambient lighting of the vehicle.

Referring to FIGS. 5B and 5C, in the second position 21, the first emission 90 may be transmitted through the second light guide and emitted toward the seat-deck portion 92 of the rear passenger seat 16 and a surface 94 of the cargo compartment 82. The second light guide may comprise a first directional emission portion 96 configured to direct the first emission of light 90 toward the seat-deck portion 92. A second directional emission portion 98 may be in optical communication with the second light guide and configured to direct the first emission 90 toward the surface 94 of the cargo compartment 82. A direction emission portion, as described herein may correspond to a lens, optic, diffuser, and/or any form of optic device configured to transmit light received from the second light guide and emit the light toward a desired portion of the passenger compartment 12 or the cargo compartment 82.

A third photoluminescent portion 100 may be disposed on the seat-deck portion 92 and a fourth photoluminescent portion 102 may be disposed on the surface 94. In response to receiving the first emission 90, the third photoluminescent portion 100 and the fourth photoluminescent portion 102 may convert the first emission 90 to output emissions 30. The third photoluminescent portion 100 may convert the first emission 90 a fourth emission 104. The fourth photoluminescent portion 102 may convert the first emission 90 to a fifth emission 106. Similar to the second emission 32 and the third emission 34, each of the fourth emission 104 and the fifth emission 106 may be emitted in a variety of colors that may differ for each of the other output emissions 30. Each of the output emissions 30 may provide for ambient and decorative lighting to illuminate at least a portion of the vehicle.

In some implementations, the first emission 92 may be directed from the light source 22 to one or more of the photoluminescent portions (24, 28, 100, 102) in both the first position 11 and the second position 22. In such implementations, a portion of the first emission 92 may be directed to a particular photoluminescent portion by the first light guide and the second light guide. The portion of the first emission may also be directed to the particular photoluminescent portion by an additional light guide or device configured to transmit the first emission 92 to the particular photoluminescent portion when the console 10 is arrange in both the first position 11 and the second position 21. In some implementations, a second light source may be disposed proximate the particular photoluminescent portion and configured to direct an emission comprising the first wavelength to the particular photoluminescent portion. For example, in some implementations, the first light guide and the second light guide may be configured to direct a portion of the first emission to the surface 94 of the cargo compartment 82. In this way, the first emission may be delivered to the fourth photoluminescent portion when the console 10 is oriented in both the first position 11 and the second position 21.

Referring to FIGS. 6A and 6B, a side cross-sectional view of the rear passenger seat 16 and the cargo compartment 82 are shown demonstrating the console 10 in the first position 11 and the second position 21, respectively. As discussed herein, the first light guide 112 may be aligned with the light source 22 in the first position 11. The first light guide 112 may receive the first emission 90 from the light source 22 via a first connector 114. In this configuration, when the console 10 is arranged in the first position 11, the first emission 90 may be transmitted from the light source 22 through the first connector 114 and into the first light guide 112. The first emission 90 may then be transmitted through a substantially light transmissive body 116 of the first light guide 112 to the first photoluminescent portion 24 and the second photoluminescent portion 28.

The first photoluminescent portion may be disposed proximate the cupholder 26. The first emission 90 may be transmitted from the light sources 22 into the first light guide 112 via the first connector 114. The first light guide 112 may be configured to transmit the first emission 90 the first photoluminescent portion 24. Upon receiving the first emission 90, the first photoluminescent portion 24 may convert the first emission 90 to the second emission 32 to illuminate at least a portion of the cupholder 26.

The second photoluminescent portion 28 may be disposed proximate an outer surface 118 of the console 10. In this configuration, the first emission 90 may be converted into the third emission 34 as the light escapes along a length 120 of the first light guide 112. In an exemplary implementation, the first light guide 112 may be disposed in a seam 122 which may correspond to an outer cloth layer the outer surface 118. In this configuration, the second photoluminescent portion 28 may be disposed proximate the outer surface 118 of the seam 122 such that the third emission 34 is emitted outward from the seam 122 to illuminate the seat-deck portion 84. A fabric used to construct the seam 122 may correspond to an at least partially light transmissive material having the second photoluminescent material disposed thereon and/or therein.

The second light guide 132 may be aligned with the light source 22 in the second position 21. The second light guide 132 may receive the first emission 90 from the light source 22 via a second connector 134. In this configuration, when the console 10 is arranged in the second position 21, the first emission 90 may be transmitted from the light source 22 through the second connector 134 and into the second light guide 132. The first emission 90 may then be transmitted through a substantially light transmissive body 136 of the second light guide 132 to the first directional emission portion 96 and the second directional emission portion 98.

The first emission 90 may be emitted from the first directional emission portion 96 and the second directional emission portion 98 may be directed toward the third photoluminescent portion 92 and the fourth photoluminescent portion 94. Upon receiving the first emission 90, the third photoluminescent portion 92 and the fourth photoluminescent portion 94 may convert the first emission 90 to the fourth emission 104 and the fifth emission 106. In this configuration, the lighting apparatus 14 is configured to illuminate at least a portion of the seat-deck portion 84 and the surface 94 of the cargo compartment 82.

The lighting apparatus as described herein may provide various benefits including a cost-effective system operable to provide attractive ambient lighting for a vehicle. The various implementations described herein including the particular locations and configurations of each of the photoluminescent portions may vary without departing from the spirit of the disclosure. The subject matter of the instant disclosure provides for a lighting apparatus that may provide for ambient lighting for vehicles in a variety of colors that may be combined in the adjusted to suit a desired color scheme for the vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle illumination apparatus comprising:
   a console rotatably connected to a portion of a seat and operable to rotate from a first position to a second position;
   a light source configured to emit a first emission of light; and
   at least one light guide configured in the first position to direct the first emission to a first photoluminescent portion disposed on the console.

2. The illumination apparatus according to claim 1, further comprising a second photoluminescent portion disposed on a rear portion of the seat.

3. The illumination apparatus according to claim 2, wherein the first emission is directed toward the second photoluminescent portion in the second position to illuminate a portion of a cargo compartment of the vehicle.

4. The illumination apparatus according to claim 1, wherein the at least one light guide comprises a first light guide and a second light guide.

5. The illumination apparatus according to claim 4, wherein the first light guide is configured to transmit the first emission in the first position and the second light guide configured to transmit the first emission in the second position.

6. The illumination apparatus according to claim 4, wherein the first light guide and the second light guide selectively transmit the first emission in response to a rotational position of the console.

7. The illumination apparatus according to claim 1, wherein the console corresponds to an armrest in the first position.

8. The illumination apparatus according to claim 7, wherein the console is configured to be substantially disposed in a cavity formed by the seat in the second position.

9. The illumination apparatus according to claim 2, wherein the console comprises a cup holder, the cup holder comprising a third photoluminescent portion selectively illuminated in the first position.

10. A vehicle illumination apparatus comprising:
    a console disposed proximate a seat;
    a light source disposed proximate the console and configured to transmit a first emission of light through at least a portion of the console;
    a photoluminescent portion disposed on the seat, wherein the first emission is emitted from the console to illuminate the photoluminescent portion in a second emission.

11. The vehicle illumination apparatus according to claim 10, further comprising a light guide, the light guide configured to transmit the first emission through the portion of the console.

12. The vehicle illumination apparatus according to claim 11, wherein the light guide is disposed in at least one seam of a material covering at least a portion of the console.

13. The vehicle illumination apparatus according to claim 12, wherein a portion of the at least one seam is directed toward the seat such that the first emission is directed outward toward the photoluminescent portion.

14. The vehicle illumination apparatus according to claim 11, further comprising a cupholder disposed in the console, the cupholder comprising an additional photoluminescent portion.

15. The vehicle illumination apparatus according to claim 14, wherein the light guide is further configured to direct the first emission to the additional photoluminescent portion to illuminate at least a portion of the cupholder.

16. A vehicle illumination apparatus comprising:
    a console rotatably connected to a portion of a seat and operable to rotate from a first position to a second position;

a light source configured to emit a first emission of light; and at least one light guide configured to direct the first emission to a first photoluminescent portion disposed on the seat in the first position to illuminate the first photoluminescent portion in a second emission.

17. The vehicle illumination apparatus according to claim 16, wherein the console corresponds to an armrest in the first position.

18. The vehicle illumination apparatus according to claim 17, the console is configured to be substantially disposed in a cavity formed by the seat in the second position.

19. The vehicle illumination apparatus according to claim 16, wherein the at least one light guide is further configured to direct the first emission toward a cargo compartment in the second position to excite a second photoluminescent portion.

20. The vehicle illumination apparatus according to claim 19, wherein the second photoluminescent portion is disposed on a surface of the cargo compartment such that a at least a portion of the cargo compartment illuminates in response to receiving the first emission.

* * * * *

UNITED STATES PATENT AND TRADEMARK OFFICE
CERTIFICATE OF CORRECTION

PATENT NO. : 9,440,584 B2  
APPLICATION NO. : 14/486476  
DATED : September 13, 2016  
INVENTOR(S) : Stuart C. Salter et al.

Page 1 of 1

It is certified that error appears in the above-identified patent and that said Letters Patent is hereby corrected as shown below:

In the Claims

Column 12, Claim 10, Line 39:  
After "console;" insert --and--.

Column 13, Claim 18, Line 11:  
After "17," insert --wherein--.

Column 13, Claim 20, Line 20:  
"such that a at" should be --such that at--.

Signed and Sealed this  
Third Day of January, 2017

Michelle K. Lee  
*Director of the United States Patent and Trademark Office*